Oct. 12, 1948.                J. E. LUNDBERG                2,451,230
                               DIRECTIONAL GYRO
Filed Sept. 24, 1947                                      2 Sheets-Sheet 1
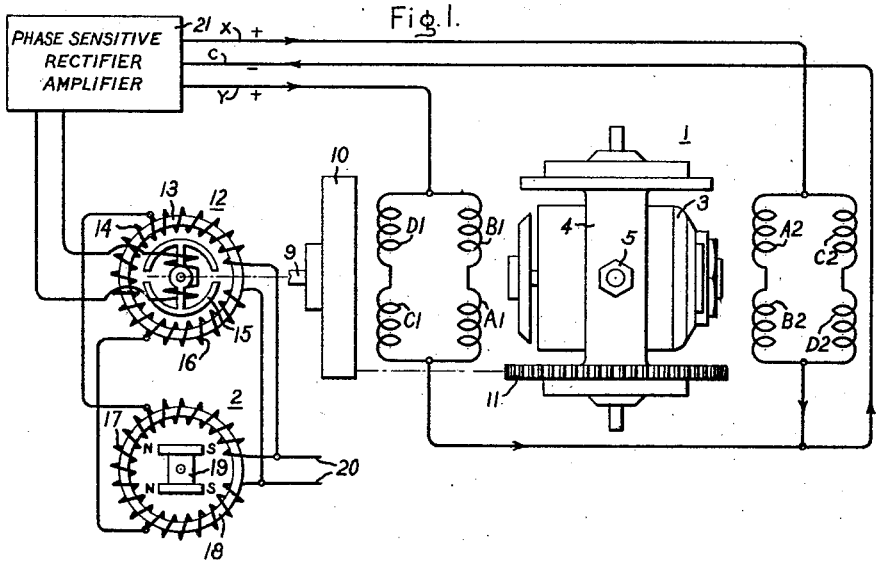
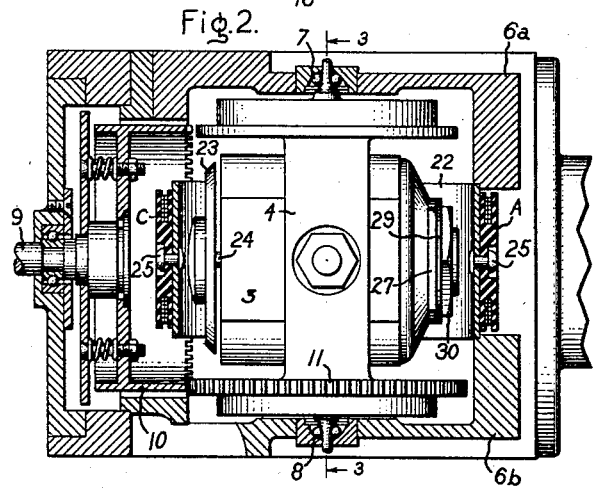
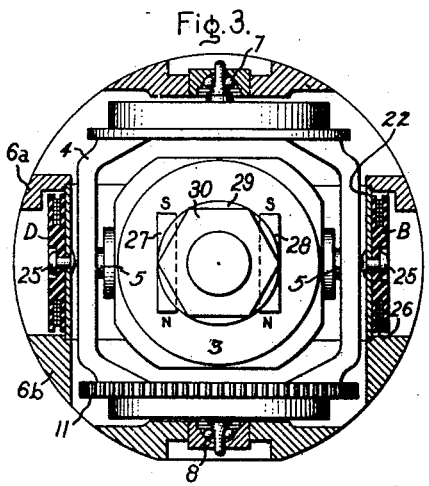
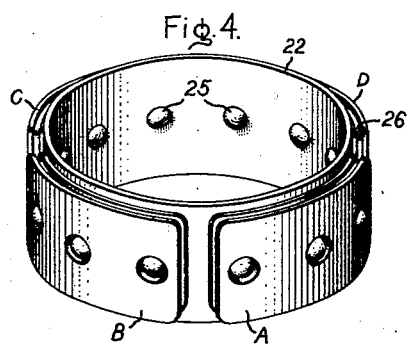
Inventor:
John E. Lundberg,
by Claude A. Mott
His Attorney.

Oct. 12, 1948.   J. E. LUNDBERG   2,451,230
DIRECTIONAL GYRO
Filed Sept. 24, 1947   2 Sheets-Sheet 2
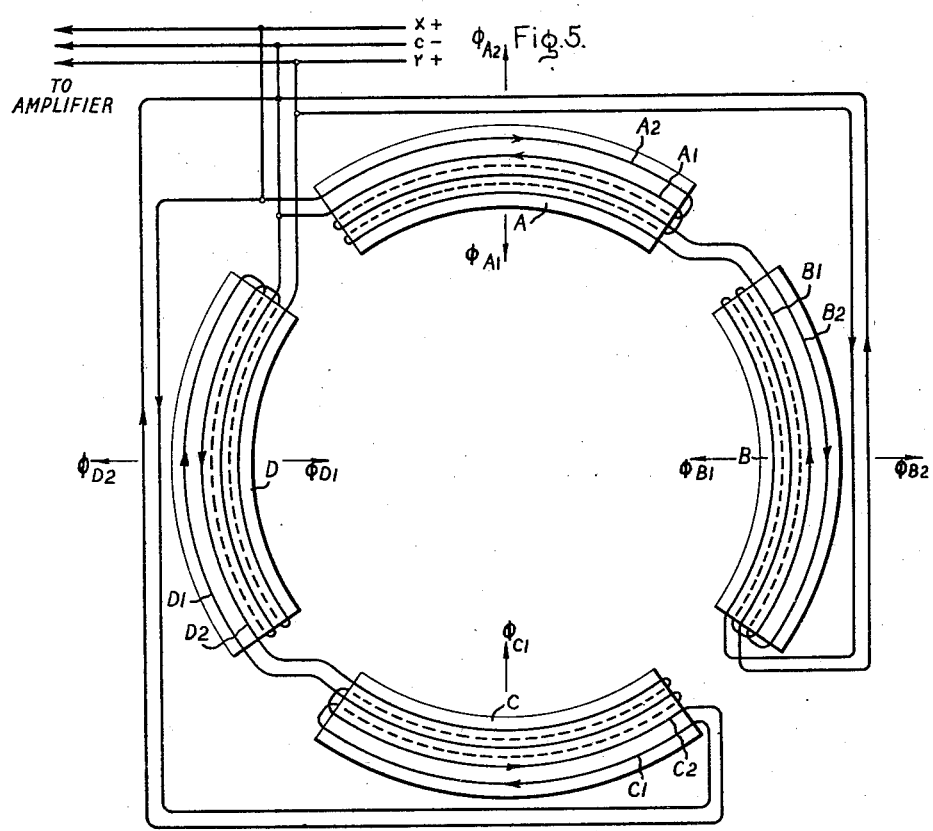
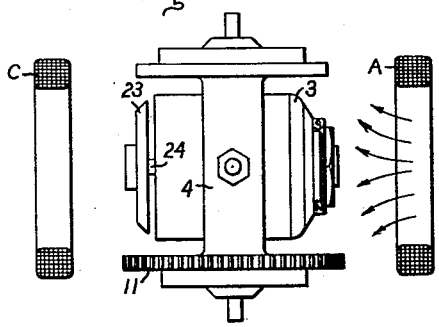
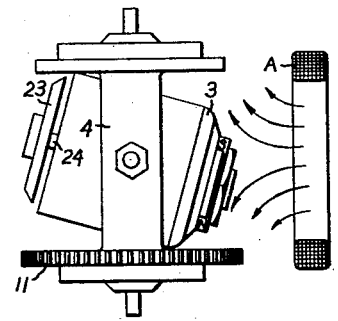
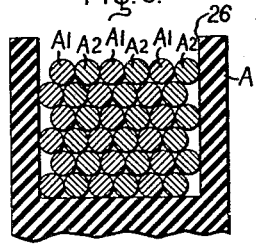
Inventor:
John E. Lundberg,
by Claude S. Nott
His Attorney.

Patented Oct. 12, 1948

2,451,230

UNITED STATES PATENT OFFICE 2,451,230

DIRECTIONAL GYRO

John E. Lundberg, Marblehead, Mass., assignor to General Electric Company, a corporation of New York Application September 24, 1947, Serial No. 775,809

10 Claims. (Cl. 74—5)

The present invention relates to a directional gyro having an improved torque motor arrangement for precessing the gyro about its vertical axis to some desired azimuth heading. The invention is well adapted, but not limited, to use in azimuth indicating instruments for aircraft in which a "slave" directional gyro is slowly precessed to a predetermined azimuth heading by signals received from a magnetic compass.

The present invention is an improvement on the compass-controlled directional gyro disclosed and claimed in a copending application of A. T. Sinks, R. F. Pfuntner, and S. Gabrielson, Serial No. 608,506, filed August 2, 1945, which is assigned to the same assignee as the present invention.

In the above-mentioned Sinks et al. application, a directional gyro is disclosed having a precession torque motor comprising a stationary coil concentric with the vertical gyro axis which provides a vertical magnetic flux reacting with magnetic flux produced by horizontal precession magnets carried on and extending across the gyro bearing frame. When compass-controlled gyros of this type are used for navigation near the North and South Poles, the compass control is disconnected and the instrument is operated as a free gyro, the reason being that magnetic compass indication, which is responsive to the horizontal component of the earth's field, becomes unreliable in these areas because of the fact that the earth's magnetic field approaches the vertical. It has been found that under these conditions the strong vertical component of the earth's magnetic field may react on the horizontal gyro precession magnets causing precession of the gyro tending adversely to affect its azimuth indication accuracy.

An object of the present invention is to provide a directional gyro having a precession-controlling torque motor utilizing precession magnets which produce no substantial reaction with the vertical component of the earth's field, thereby avoiding impairment of the accuracy of the instrument when used as a free gyro during polar flight.

It has also been found that the precession magnets, in the arrangement of the above Sinks et al. application, produce fields tending to react with rotating parts of the gyro including the adjacent rotor and rotating magnet forming a part of an eddy current leveling system. This reaction tends to increase the starting time of the gyro which may be disadvantageous during low temperature operation.

A further object of the invention is to provide a torque motor arrangement in which the precession magnets may be relatively widely separated from the gyro rotor and leveling magnets thereby avoiding undesirable drag torque on the gyro rotor.

A further object of the invention is to provide an improved torque motor arrangement for a directional gyro which is relatively simple and compact, providing economies and convenience in the design of gyro instruments.

Further objects and advantages of my invention will become apparent as the following description proceeds, and the features of novelty which characterize the invention will be pointed out with particularity in the claims annexed to and forming a part of this specification.

In the drawing,

Fig. 1 is a schematic representation of a compass-controlled gyro system utilizing a directional gyro constructed in accordance with the present invention.

Fig. 2 is a side elevation view, partly in section, showing constructional details of the directional gyro.

Fig. 3 is a rear view, partly in section, of the directional gyro looking in the direction of the arrows 3—3 of Fig. 2.

Fig. 4 is a perspective view showing the arrangement of the precession coils of the torque motor.

Fig. 5 is a wiring diagram showing how the torque motor precession coils are interconnected.

Fig. 6 is a fragmentary sectional view of one of the precession coils showing the winding arrangement thereof.

Figs. 7 and 8 are simplified representations of the directional gyro in different operating positions which are useful in explaining the operation of the invention.

In Fig. 1 of the drawing, there is shown a compass-controlled directional gyro system in which the directional gyro of the present invention may be advantageously used. It is to be understood, however, that this illustrated use is exemplary only and that the invention may be used wherever found applicable.

The illustrated compass-controlled gyro system comprises a directional gyroscope 1, a magnetic compass 2, and associated apparatus for precessing the gyro about its vertical axis into correspondence with the magnetic heading indicated by the compass.

The directional gyro comprises a gyro rotor bearing frame 3 which houses a gyro rotor (not shown) rotating about a normally horizontal spin axis. The gyro bearing frame is pivotally mounted on a gimbal 4 by means of trunnions 5 which permit rotation of the bearing frame about a horizontal minor gyro axis perpendicular to the spin axis. The gimbal 4 is mounted on upper and lower frame members 6a and 6b by ball bearings 7 and 8 which permit the gimbal to rotate about a vertical major gyro axis. The major and minor gyro axes and the gyro spin axis intersect at a center of suspension about which the gyro bearing frame is balanced for neutral equilibrium. The gyro rotor is driven at a high speed by a suitable motor housed within the bearing frame (not shown) and due to gyroscopic action the spin axis of the gyro tends to maintain its orientation in space thereby providing a directional reference as is well understood by those skilled in the art.

The gyro instrument, of which the subject directional gyro forms a part, has a direction indicating pointer or dial (not shown) driven by a shaft 9 connected to the rotatable gimbal 4 by means of a cup gear 10 carried on the shaft which meshes with a cooperating gear 11 connected to the lower part of the gimbal.

For the purpose of continuously comparing the azimuth positions of the gyro and the compass and correcting the gyro for any deviations from a position of correspondence with the compass, there is provided an electrical detector Selsyn indicated generally at 12. The detector comprises a magnetic stator 13 carrying a primary stator winding 14 and a rotor 15 carrying a rotor secondary winding 16. The rotor 15 of the detector is coupled to the gyro by the shaft 9 as shown. The detector stator winding 14 is connected to a winding 17 on a compass transmitter ring 18 which is stationary and coaxially mounted relative to privoted compass magnets 19, the compass and detector stator windings being excited from a common source of alternating current indicated at 20. The compass transmitter ring 18 is formed of saturable magnetic material and due to saturation effects, the compass magnets 19 cause second harmonic voltages to be induced in the winding 17 which vary in accordance with the position of the compass magnets relative to the transmitter ring. For the reasons pointed out in detail in Sinks Patent 2,414,128, this arrangement causes a voltage to be induced in the detector winding 16, the polarity of which indicates the direction of departure of the directional gyro from a position of correspondence with the compass, the voltage being zero when correspondence is attained.

The detector winding 16 is connected to a phase sensitive amplifier rectifier of known construction indicated schematically at 21. The direct current output of the amplifier 21, which varies in accordance with the polarity of the A. C. input signal output of the detector 12, is connected to a direct current torque motor which causes the gyro to precess in a direction to restore correspondence between the compass and gyro as will be clear by reference to the above-mentioned Sinks patent. The present invention relates to an improved torque motor and gyro construction which will now be described in detail.

For the purpose of maintaining the spin axis of the gyro in an approximately horizontal position, there is provided a leveling device comprising a ring 22 formed of electrically conducting non-magnetic material, such as copper or aluminum, which is clamped between the upper and lower frame sections 6a and 6b. The ring is coaxially arranged relative to the vertical axis of the gyro. The ring 22 cooperates with a rotating magnet 23 connected to and driven by the gyro rotor through a shaft extension 24 projecting from the left end of the bearing frame. The rotating magnet 23 causes eddy currents to be induced in the ring 22 which result in the application of drag torques to the gyro bearing frame 3. When the bearing frame is in the level position shown, the drag torques balance and no net torque is applied to the bearing frame. However, if the bearing frame tips from the level position, the drag torques become unbalanced and a net torque is applied to the bearing frame 3 about the vertical gyro axis resulting in a precession of the gyro about the horizontal gyro axis in a direction to restore the bearing frame to the level position. No claim is here made to the leveling system per se as this system has been disclosed and claimed in the above-mentioned Sinks et al. application, Serial No. 608,506. However, my improved torque motor cooperates with and may be combined advantageously with a leveling system of this type as will be apparent as the description proceeds.

Turning now to the details of the torque motor construction, it will be noted that there are provided four curved coil forms A, B, C, and D (Fig. 4), which are secured around the outside of the leveling ring 22 by means of rivets 25. The coil forms have a sufficient thickness to permit coils of wire to be wound thereon, the coils being positioned in grooves 26 around the edges thereof. As best shown in Figs. 5 and 6 of the drawing, two coils are wound on each of the coil forms A, B, C, and D, these coils being identified, respectively, as A1 and A2, B1 and B2, C1 and C2, and D1 and D2. The wires of each pair of coils are preferably wound together on the supporting coil form as shown in Fig. 6. This arrangement insures that the two coils will have not only common flux axes but will also have a common magnetic center which is desirable from the standpoint of symmetrical operation as will subsequently be apparent.

The amplifier 21 has three output connections labeled X, Y and C, and for the purpose of explanation the terminals X and Y may be considered positive and the terminal C a common negative return. It will be noted that the coils A1 and B1 are connected in series in a circuit connecting the amplifier terminals Y and C and that the coils C1 and D1 are also series connected, these latter coils being connected in parallel with the coils A1 and B1 (Fig. 1). Thus current flowing from the amplifier terminal Y to the common return C flows through coils A1, B1, C1 and D1, the winding directions of these coils being such that they produce magnetic fluxes directed inwardly towards the vertical axis of the gyro, these fluxes being indicated by the vectors $\phi A1$, $\phi B1$, $\phi C1$ and $\phi D1$.

The coils A2 and B2 are connected in series in a circuit connecting the amplifier terminal X to the common return C and the coils C2 and D2 are series connected, the latter coils being connected in parallel with the coils A2 and B2. The winding directions of the coils A2, B2, C2 and D2 are selected such that current flowing from the terminal X to the terminal C of the amplifier produces magnetic fluxes extending radially away from the vertical axis of the gyro as indicated by the vectors $\phi A2$, $\phi B2$, $\phi C2$ and $\phi D2$. Since the coils A1, A2, B1, B2, C1, C2, and D1, D2 tend to produce magnetic fluxes in opposite directions, it will be apparent that the net flux produced by the coil pairs on the forms A, B, C and D will depend on the relative ampere turns of the coils of each pair. If the coils of each pair have equal number of turns, it will also be apparent that if the current flowing through coils A1, B1, C1 and D1 is equal to the current flowing through coils A2, B2, C2 and D2, the net radial flux produced by all of the coils will be zero.

The amplifier 21 preferably has a characteristic such that when the input signal is zero, the direct currents flowing between the terminals X and C and between Y and C are equal so that the net flux of all of the precession coils is zero. When an input signal of one polarity is applied to the amplifier, the current flowing between the terminals Y and C increases and the current flowing between the terminals X and C decreases. For this condition, the fluxes produced by the coils A1, B1, C1 and D1 predominate so that the net flux produced by the precession coils is directed radially inward. When an input signal of the opposite polarity is applied to the amplifier, the current flowing between the terminals X and C increases, relative to the balanced condition, and the current flowing between the terminals Y and C decreases. For this condition, the fluxes produced by the coils A2, B2, C2 and D2 predominate so that the net flux of the precession coils is directed radially outward.

It will be clear from the foregoing that when the directional gyro 1 deviates in one direction from a position of correspondence with the compass 2, the precession coils produce a net flux directed radially inward and when the gyro deviates in the opposite direction the precession coils produce a net flux directed radially outward.

Mounted on the right-hand end of the bearing frame 3 are a pair of permanent bar magnets 27 and 28 which may be termed precession magnets. These magnets are held in position against the end of the bearing frame by means of a clamping washer 29 secured by a nut 30 which also holds in position the right-hand bearing assembly of the gyro rotor (not shown). The magnets 27 and 28 have north and south pole faces at opposite ends thereof, and they are mounted in a position such that they are vertical when the gyro spin axis is in the level position shown and produce a vertically extending magnetic flux field.

It will be noted that the precession magnets 27 and 28 are considerably displaced from the vertical gyro axis in the direction of the gyro spin axis. Thus the precession magnets lie adjacent different ones of the precession coils depending upon the azimuth position of the bearing frame about the vertical gyro axis. The horizontal spacing between the precession magnets is made greater than the spacing between adjacent precession coils so that regardless of the azimuth position of the bearing frame at least one of the precession magnets lies within the field produced by a precession coil.

When the gyro bearing frame is in an approximately level position, it will be apparent by reference to Fig. 7 that the magnetic fields produced by the precession magnets and the adjacent precession coils are approximately in perpendicular relation whereby a torque is produced tending to rotate the bearing frame about the horizontal gyro axis. This torque in turn causes a precession of the gyro about the vertical axis in accordance with the well known laws of gyroscopic precession. The direction of this torque and the resulting gyro precession depend upon the direction of the radial flux produced by the precession coils and upon the direction of rotation of the gyro rotor. It will be clear that by a proper correlation of these factors and the phasing of the amplifier 21, the above described system can be made to cause the gyroscope to be precessed in a direction to restore correspondence between the gyro and compass headings, the net precession coil flux and the gyro precession rate falling to zero when correspondence is attained.

It will be noted that my improved torque motor arrangement, which utilizes magnetic fluxes extending radially relative to the vertical gyro axis, permits the use of precession magnets which are mounted in a vertical position perpendicular to the gyro spin axis as distinguished from known previous arrangements in which they were required to be mounted horizontally in a direction parallel with the spin axis. This arrangement has the advantage that the vertical component of the earth's magnetic field is parallel to the field produced by the precession magnets so that there is substantially no torque reaction therebetween tending to cause an erroneous precession of the gyroscope. Thus during polar flights when the instrument is used as a free gyro and the vertical component of the earth's field is strong, the accuracy of the instrument is not impaired. For other conditions of flight remote from the polar areas, the magnetic compass controls the direction of the gyro and the effect of the horizontal component of the earth's field on the precession magnets is of substantially no consequence.

It will also be noted that my improved torque motor construction makes possible a relatively wide spacing between the precession magnets and the rotating leveling magnet 23 and also between the precession magnet and the gyro rotor encased within the bearing frame 3. This relatively wide spacing, which was not possible with previously used horizontal precession magnets, prevents interaction between the fields produced by the precession magnets and the rotating leveling magnets, which interaction in previous arrangements was found considerably to increase the gyro starting time which was found to be disadvantageous especially in cases where all available motor starting torque was needed to start the rotor and bring it up to speed quickly during conditions of low temperature operation. Also, this isolated location of the precession magnets prevents the fields produced thereby from causing eddy currents to be generated in the gyro rotor, which would tend to produce a drag torque on the rotor.

When the compass-controlled directional gyro system is used on aircraft, the indications provided by the compass are unreliable when the aircraft is in a substantially banked attitude, due to the fact that under this condition the compass magnets are thrown off because of the disturbing action of the vertical component of the earth's magnetic field. During such times it is desirable that the correcting action of the compass on the gyroscope be cut off. With my improved torque motor construction, the gyro precession torque is, to a large extent, cut off automatically during conditions of banked flight thereby preventing erroneous precession of the gyroscope due to erroneous indications of the compass. This action may be best understood by reference to Figs. 7 and 8 of the drawing. When the aircraft is flying level, the leveling system described above maintains the gyro spin axis and bearing frame in the horizontal position shown in Fig. 7. When the bearing frame is in this position, it will be noted that the magnetic fluxes produced by the precession magnets and the precession coils are approximately perpendicular so that precessing torque is obtained. However, when the aircraft is banked, the normally vertical gyro axis becomes inclined relative to the gyro spin axis due to the fact that the gyro tends to maintain its space direction. The leveling device tends to correct this condition, but its action is relatively slow so that the tipped condition of the gyro bearing frame shown in Fig. 8 occurs. Due to the fact that the flux produced by the precession coils tends to curve outwardly around the coils at a considerable distance from the center thereof, the flux of the precession coil and the precession magnets tends to become parallel as shown, resulting in zero precession torque. Thus the desired automatic torque-motor cut off during banked conditions of flight is obtained.

It will be noted that the precession coils A, B, C and D are separable and that they each produce their own separate magnetic fields. Thus it is not necessary to mount all pairs of the precession coils on the leveling ring 22 as shown, and in some cases it has been found convenient to mount two sets of the coils on the leveling ring and support the remaining coils on either of the frame members 6a or 6b. The flexibility in design thus provided facilitates the solution of assembly and clearance problems. Furthermore, the fact that the various pairs of precession coils such as, for example, A1 and A2 have a common magnetic center insures symmetry of generated magnetic flux in opposite radial directions and consequently equal gyro precession rates in either direction about the vertical axis. Because of this, the gyro seeks the true mean position of the compass magnets which are usually in a state of continuous oscillation.

What I claim as new and desire to secure by Letters Patent of the United States is:

1. In combination, a directional gyro comprising a gyro rotor bearing frame mounted in a gimbal for rotation about vertical and horizontal gyro axes, and a torque motor for precessing said gyro about its vertical axis, said torque motor comprising one or more magnets mounted on said bearing frame to produce a vertically extending magnetic field and a plurality of fixed precession coils arranged around said bearing frame in a circle concentric with said vertical axis and oriented with their flux axes extending in directions of radii of said circle.

2. In combination, a directional gyro comprising a gyro rotor bearing frame mounted in a gimbal for rotation about vertical and horizontal gyro axes, and a torque motor for precessing said gyro about its vertical axis, said torque motor comprising one or more magnets mounted on said bearing frame to produce a vertically extending magnetic field and a plurality of pairs of fixed precession coils arranged around said bearing frame in a circle concentric with said vertical axis and oriented with the flux axis of each pair extending in directions of radii of said circle, each pair of coils being wound together on a common support so that they have a common magnetic center.

3. In combination, a directional gyro comprising a gyro rotor bearing frame mounted in a gimbal for rotation about vertical and horizontal gyro axes, a plurality of fixed precession coils arranged around said bearing frame in a circle concentric with said vertical axis and oriented with their flux axes extending in directions of radii of said circle, and magnet means mounted on said bearing frame in a position laterally displaced from said vertical axis and oriented so that the flux produced thereby reacts with the flux produced by different ones of said precession coils determined by the azimuth position of said bearing frame about said vertical axis to produce a torque on said bearing frame causing precession of said gyro about said vertical axis.

4. In combination, a directional gyro comprising a gyro rotor bearing frame mounted in a gimbal for rotation about vertical and horizontal gyro axes, a plurality of fixed precession coils arranged around said bearing frame in a circle concentric with said vertical axis and oriented with their flux axes extending in directions of radii of said circle, and one or more permanent magnets mounted on said bearing frame in a position laterally displaced from said vertical axis and oriented so that the flux axis of each magnet normally extends in an approximately vertical direction so as to cause substantially no torque reaction with the vertical component of the earth's magnetic field, each magnet reacting with the flux produced by different ones of said precession coils determined by the azimuth position of said bearing frame about said vertical axis to produce a torque on said bearing frame causing precession of said gyro about said vertical axis.

5. A directional gyro comprising a gyro rotor carried in a bearing frame gimbal mounted for rotation about vertical and horizontal gyro axes, a leveling device for leveling said bearing frame about said horizontal axis comprising a rotating magnet driven by the gyro rotor and a cooperating, relatively fixed nonmagnetic electrically conducting ring mounted concentric with vertical gyro axis, and a torque motor for precessing said gyro about said vertical axis, said torque motor comprising a plurality of precession coils mounted around said ring and oriented so that their flux axes extend in directions of radii of said ring, and a cooperating torque-producing precession magnet mounted on said bearing frame, said rotating magnet and said precession magnet being disposed on opposite sides of said vertical gyro axis, the resultant spacing therebetween acting to prevent substantial interaction of the magnetic flux fields produced thereby which would otherwise tend to produce a drag torque on the gyro rotor.

6. A directional gyro comprising a gyro rotor carried in a bearing frame gimbal mounted for rotation about vertical and horizontal gyro axes, a leveling device for leveling said bearing frame about said horizontal axis comprising a rotating magnet driven by the gyro rotor and a cooperating, relatively fixed nonmagnetic electrically conducting ring mounted concentric with vertical gyro axis, and a torque motor for precessing said gyro about said vertical axis, said torque motor comprising a plurality of precession coils mounted around said ring and oriented so that their flux axes extend in directions of radii of said ring, at least one of said precession coils being mounted on and carried by said ring, and a cooperating precession magnet mounted on said bearing frame and laterally displaced relative to said vertical axis so as to lie in adjacent, torque-producing relation with different ones of said precession coils depending on the azimuth position of said bearing frame about said vertical axis.

7. A directional gyroscope comprising a gimbal member mounted on a support for rotation about a vertical major gimbal axis, a gyro rotor carried in a bearing frame mounted on said gimbal member for rotation about a horizontal minor gimbal axis perpendicular to the spin axis of the gyro rotor, said gyro rotor spin axis and major and minor gimbal axes intersecting at a center of suspension of said bearing frame, a plurality of fixed precession coils mounted in a circular pattern around said bearing frame and oriented so that the flux axes thereof extend in radial directions relative to said major gimbal axis, precession magnet means mounted on said bearing frame so as to be laterally displaced from said center of suspension in the direction of the gyro rotor spin axis, said precession magnet means being oriented so that the magnetic flux produced thereby reacts with the radial flux produced by an adjacent precession coil and produces a torque on said bearing frame about said minor gimbal axis causing precession of said gyro about said major gimbal axis when the gyro spin axis is approximately perpendicular to said major gimbal axis, and means for reversing the radial direction of the flux produced by said precession coils to control the direction of precession of said gyro.

8. In combination, a directional gyro comprising a gyro rotor bearing frame mounted on a gimbal member for rotation about a horizontal gyro axis, said bearing frame supporting a gyro rotor rotating about a spin axis perpendicular to said horizontal axis and said gimbal member being mounted on a support for rotation about a vertical gyro axis, said gyro axes intersecting a center of suspension of said bearing frame, a plurality of relatively fixed precession coils disposed around said bearing frame in a circle having its center approximately coincident with said vertical gyro axis, said coils being oriented so that the magnetic flux axes thereof extend in the direction of radii of said circle, one or more precession magnets mounted on said bearing frame laterally displaced from said center of suspension in the direction of said gyro spin axis so as to lie adjacent different ones of said precession coils depending on the azimuth position of said bearing frame, each precession magnet being oriented with its flux axis approximately vertical when the gyro spin axis is horizontal so that the magnetic flux produced thereby reacts with the radial flux produced by an adjacent precession coil and produces torque on said bearing frame about said horizontal gyro axis causing precession of said gyro about said vertical axis, and precession controlling means arranged to selectively control the direction of the flux produced by said precession coils.

9. The combination set forth in claim 8 and leveling means arranged slowly to precess the gyro about said horizontal axis to a position in which the spin axis is level.

10. A directional gyro comprising a gyro rotor bearing frame mounted on a gimbal for rotation about vertical and horizontal gyro axes, a plurality of pairs of fixed precession coils arranged around said bearing frame in a circle concentric with said vertical axis, the precession coils of each pair being coaxially wound and the flux axes of said pairs of precession coils extending in directions of radii of said circle, a precession magnet mounted on said bearing frame in a position laterally displaced from said vertical axis and oriented so that the flux produced thereby reacts with the flux produced by different ones of said pairs of precession coils determined by the azimuth position of said bearing frame about said vertical axis to produce a torque on said bearing frame about said horizontal axis causing precession of said gyro about said vertical axis, means for supplying current to one of each of said pairs of precession coils in a direction tending to produce a flux directed radially inward, means for supplying current to the other of each of said pairs of precession coils in a direction tending to produce a flux directed radially outward whereby each pair of precession coils produces a net radial flux the direction of which depends on the relative ampere turns of the precession coils of each pair, and means for varying the relative values of said currents to control the direction of said net flux and consequently the direction of said gyro precession.

JOHN E. LUNDBERG.

REFERENCES CITED

The following references are of record in the file of this patent:

UNITED STATES PATENTS

| Number | Name | Date |
|---|---|---|
| 2,315,216 | Moller et al. | Mar. 30, 1943 |
| 2,368,644 | Curry, Jr. | Feb. 6, 1945 |
| 2,390,532 | Haskins, Jr., et al. | Dec. 11, 1945 |